Figure 1:
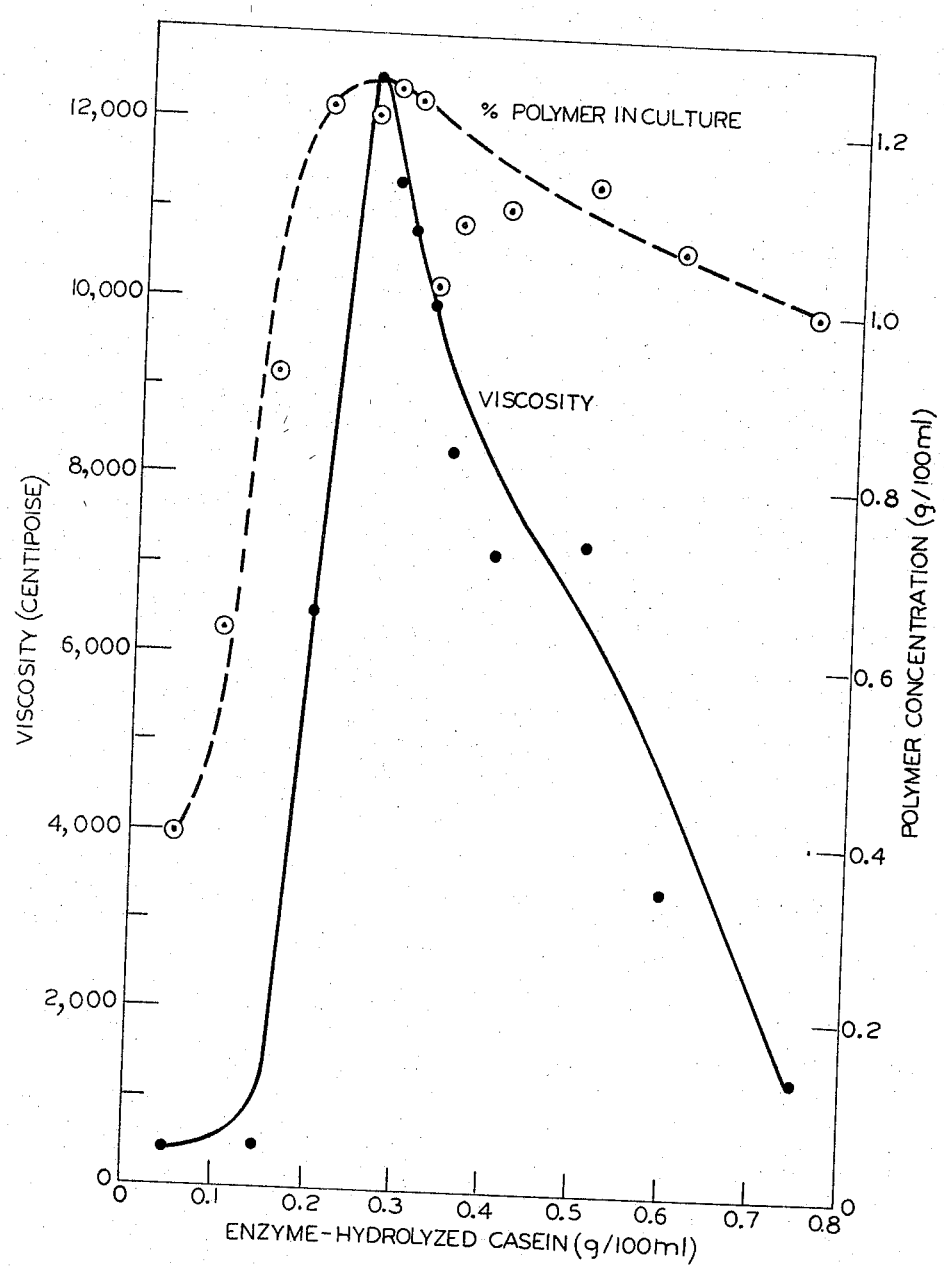

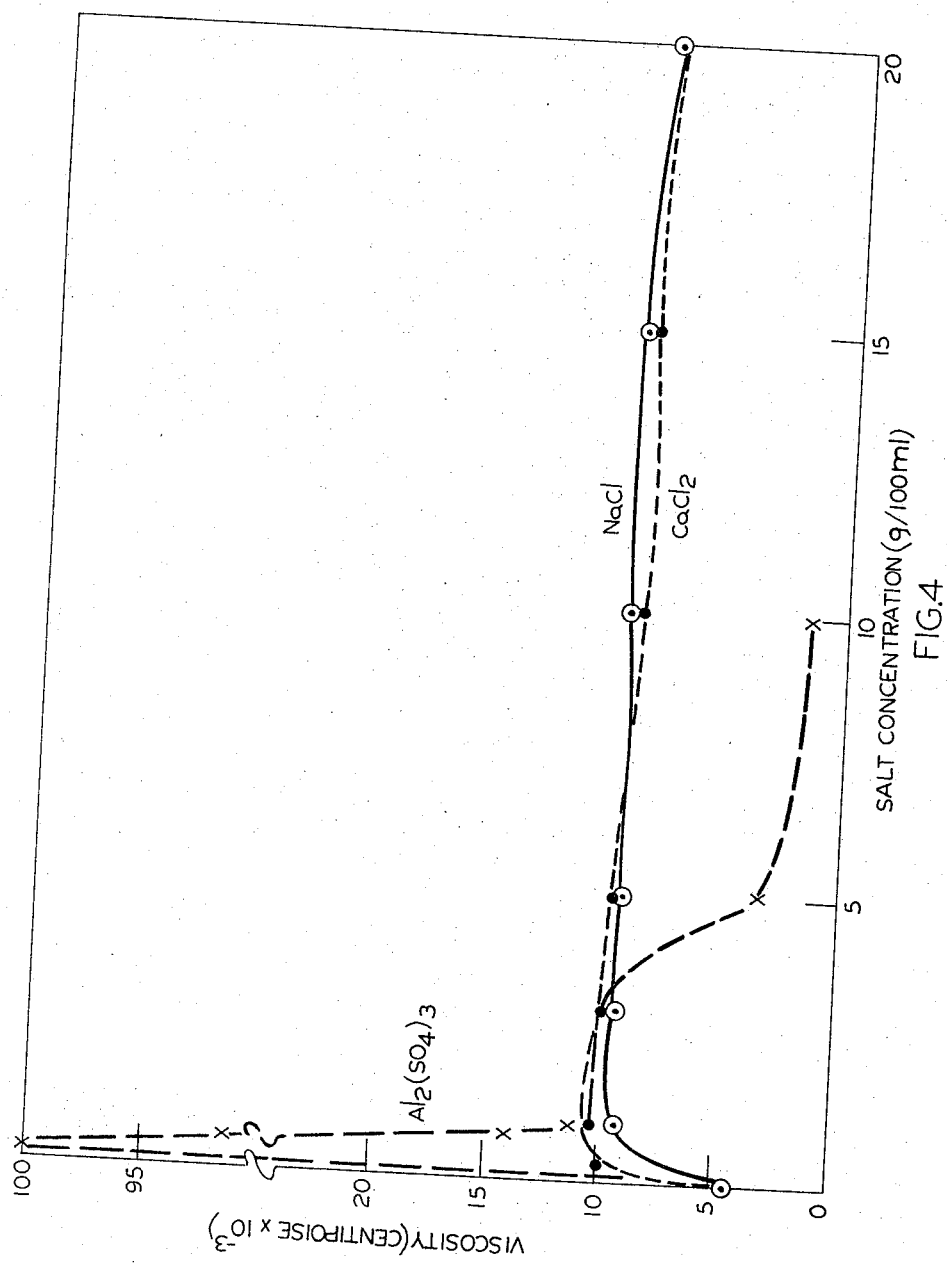

United States Patent Office 3,314,801
Patented Apr. 18, 1967

3,314,801
MICROBIAL POLYSACCHARIDE AND PROCESS
Martin C. Cadmus and Ralph F. Anderson, Peoria, Ill., assignors to the United States of America as represented by the Secretary of Agriculture
Original application Oct. 24, 1963, Ser. No. 318,769, now Patent No. 3,228,855, dated Jan. 11, 1966. Divided and this application Aug. 17, 1964, Ser. No. 399,117
1 Claim. (Cl. 99—139)

A nonexclusive, irrevocable, royalty-free license in the invention hereindescribed, throughout the world for all purposes of the United States Government, with the power to grant sublicenses for such purposes, is hereby granted to the Government of the United States of America.

This application is a division of application bearing Ser. No. 318,769, filed Oct. 24, 1963, now Patent No. 3,228,855, granted Jan. 11, 1966.

This invention relates to a novel microbial polysaccharide, aqueous solutions of which novel polysaccharide polymer display unique viscosity characteristics that make the edible polymer particularly advantageous as a thickening agent broadly and as an additive for oil well drilling fluids and foodstuffs in particular. This invention also relates to a process for obtaining the novel polysaccharide in yields of 40–45 percent based on the carbohydrate nutrient rather than in commercially unattractive yields of only about 15–20 percent obtained when the amount of nitrogen source in the fermentation medium is not restricted (see FIG. I) and certain metal ions, namely Mg and Mn are not available.

More particularly this invention relates to the production in commercially acceptable yields of a novel water-soluble uronic acid polysaccharide, the constituent sugars of which are glucose and galactose, by fermenting heretofore unclassified microorganism belonging to the genus Arthrobacter, no prior art members of which genus have ever been known to produce a polysaccharide gum.

Still more particularly this invention relates to the discovery that certain previously undescribed microorganisms belonging to the diphtheroidic genus Arthrobacter are capable of producing high yields of a novel water-soluble polysaccharide when fermented under certain aerobic conditions for 3 to 4 days in a medium comprising carbon and restricted nitrogen sources, as well as preferably, trace amounts of manganese in addition to obligatory amounts of magnesium ion.

Certain microbial polysaccharide gums are widely known, e.g., the dextrans which consist entirely of glucose units and are produced from sucrose by the enzymes of Leuconstoc bacteria. Less well known are the phosphomannan gums produced by yeasts belonging to the genus Hansenula, Anderson et al., Arch. Biochem. Biophys. 89: 289 (1960) whose constituent sugars are mannose and mannose-6-phosphate, the polysaccharide produced by *Cryptococcus laurentii*, containing xylose, mannose, glucuronic acid, and acetyl in the ratio of 1:4:1:1, Cadmus et al., Appl. Microbiol., 10: 153 (1962), as well as "polysaccharide B-1459" produced by the bacterium *Xanthomonas campestris*, NRRL B-1459, Rogovin et al., J. Biochem. Microbiol. Technol. Eng., 3: 51 (1961) which consists of mannose, glucose, glucuronic acid and acetyl in the ratio of 2:1:1:1.

As already indicated, the constituent sugars of the polysaccharide produced by *Arthrobacter viscosus* NRRL B-1973 and NRRL B-1797 are D-glucose and D-galactose in equimolar proportions, there also being an equimolar proportion of D-mannuronic acid moieties and 5 molar equivalents of O-acetyl groups linked to 5 of the 8 nominal hydroxyl positions of the sugars, thus constituting 25.5 percent of the dry weight of the polysaccharide, see Sloneker et al., p. 24D, Abstr. of Papers, 145th Meeting of A.C.S., New York City, Sept. 9, 1963. In other words the B-1973 polysaccharide comprises highly acetylated repeating units consisting of a mannopyranosyluronic acid residue linked beta 1:3 to a glucopyranosyl residue linked 1:4 to a galactopyranosyl residue which latter is again linked 1:4 to a beginning mannopyranosyluronic acid residue.

One object of our invention is the production of a novel polysaccharide having unique and advantageous properties in solution. Another object is a process for producing a polysaccharide gum polymer by fermenting members of novel species of diphtheroidic bacterium found in a soil sample from Guatemala and now definitively identified as belonging to the genus Arthrobacter.

In accordance with standard taxonomic and physiological findings, herein set forth, we have classified the novel polysaccharide-producing organism as belonging to the genus Arthrobacter and have assigned them the species name *viscosus* as well as the accession numbers NRRL B-1973 and NRRL B-1797.

In accordance with the objects of our invention we have made the discovery that two virtually indistinguishable strains of Arthrobacter, specifically *A. viscosus* NRRL B-1973 and *A. viscosus* NRRL B-1797 under certain fermentation conditions elaborate excellent yields of an edible polysacaccharide gum which has a novel constitution and unique characteristics and properties.

Parallel fermentations with inocula of the above organism were made in media comprising enzyme-hydrolyzed casein equivalent to 0.04 percent total nitrogen as the nitrogen source and respectively dextrose, technical maltose, or pure maltose as the carbon source. Because the yields with technical maltose were 2 to 3 times that obtained with the other carbohydrates, we sought an explanation. Addition to the dextrose-containing medium of the two amino acids known to be present in crude maltose gave no improvement in yield. However, the addition of ash from a sample of technical maltose increased the yield of the polysaccharide by two to three fold, and it was subsequently determined that magnesium was mainly responsible, a level of 0.08 percent

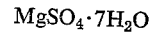

$MgSO_4 \cdot 7H_2O$ being optimal, traces of the manganese ion also being required. Polysaccharide production was found to be unaffected by the presence or absence of ferric, cobalt, or molybdenum ions. Maximum yields of polysaccharide having a maximum molecular weight are obtained when the pre-sterilization pH of the medium is adjusted to pH 7.0 and 0.4 percent of $KH_2PO_4$ buffer is added. When 0.8 percent buffer was used the yield was very slightly greater but the polymer was more crystalline in nature and probably had a lower molecular weight inasmuch as the viscosities obtained in solution were lower.

The distinguishing characteristics of our novel polysaccharide polymer are exemplified in the viscosity responses of dilute solutions thereof to heat (FIG. II) and to salts, especially aluminum sulfate, shown in FIGS. III and IV.

Whereas the viscosities of solutions of other polysaccharides decrease, particularly in the presence of a salt, as the temperature is increased, solutions of our novel polysaccharide actually increase in viscosity as the temperature is increased, and on cooling the solution, the viscosity then increases further. On autoclaving at 121° C. for 15 minutes and cooling, solutions containing about 1.5 percent or more of the polysaccharide actually become gels that tend to retain the shape of the container. In the presence of KCl, a 0.75 percent solution of the polysaccharide gels on cooling. The addition of 2 percent KCl, even without heating to solutions containing 0.5 percent or more of the polysaccharide very markedly increases the viscosity. As shown in FIGURE 4 of the drawing, the addition of 0.5 percent of NaCl or $CaCl_2$ doubles the viscosity, but larger additions of these salts do not result in greater increases. The addition of 0.05 percent aluminum sulfate to a 1.0 percent solution of the polysaccharide is unique in that it causes a 20-fold increase in viscosity, but further additions of aluminum sulfate to beyond the 0.25 percent level result in a precipitous dropping off of viscosity to a level somewhat below that of the original solution. The viscosity is stable to pH variations within the range 5.0–10.0. It is apparent that the above responses to temperature and to salts make the polymer very valuable for a diversity of industrial uses, e.g., as an additive for specialty meats, pudding mixes, etc. and as an important constituent of salt-resistant oil well drilling fluids.

In connection with the following specific example, it should be pointed out that the only difference between fermenting an inoculum of NRRL B–1973 and of NRRL B–1797 is that the former gives a very slightly (ca. 3 percent) greater yield of polymer. Also, shake flasks are not suitable for obtaining suitable yields of the polysaccharide, probably because of poor aeration after the culture fluid begins to thicken. Twenty-liter fermentors having paddles are suitable, the paddles being operated at 200 r.p.m. the first day, 300 r.p.m. the second day, and 500 r.p.m. the third and fourth days. The yields were significantly reduced when fermeneations were started at 500 r.p.m.

EXAMPLE 1

A paddled 20 l. fermentor containing 10 l. of a sterilized fermentation medium having a pH of 7.0 and the following composition per 100 ml.

|  | G. |
|---|---|
| Commercial corn sugar | 3 |
| Enzyme-hydrolyzed casein | 0.25 |
| $MgSO_4 \cdot 7H_2O$ | 0.08 |
| $MnSO_4 \cdot 4H_2O$ | 0.005 |
| $KH_2PO_4$ | 0.4 |

Water q.s.a.d. 100.

was inoculated under sterile conditions with 500 ml. of material from a proliferating 1-day fermentation of Arthrobacter viscosus NRRL B–1973 in the same medium and incubated at 25° C. under a positive pressure of 1 atmosphere with air admitted at the rate of 0.25 vol. air/liter per min. The paddles were operated at 200 r.p.m. during the first 24 hours, at 300 r.p.m. during the second 24 hours, and at 500 r.p.m. during the next 48 hours. The viscous culture liquor was then diluted with 4 parts of water plus ½ volume of absolute methanol and supercentrifuged for 30 minutes to precipitate cells and debris. The supernatant containing the polysaccharide polymer was then treated by adding 1 g. potassium acetate per 100 ml. (a like amount of KCl can be substituted for the acetate) and 2.5 vols. of 95 percent ethanol to precipitate 92–96 percent of the polymer therefrom.

The precipitate was collected, redissolved in water, reprecipitated, and lyophilized to obtain 1.4 g. of a dry spongy, white product from each 100 ml. of fermented liquor. Based on the initial carbohydrate nutrient, the yield was 47 percent of a polysaccharide composed of gulcose, galactose, manuronic acid, and acetyl groups, which groups are present in molar proportions of 1:1:1:5.

Tables I and II summarize the taxonomic and physiological characteristics of Arthrobacter viscosus NRRL B–1973 and NRRL B–1797 as compared with the corresponding spectra for known Arthrobacter species.

Strains NRRL B–1797 and B–1973 produced extremely viscous growth on a variety of media supplemented with various carbon sources. Stained cells from an 18-hour culture on yeast-malt agar showed the presence of highly plemorophic, gram-negative cells. These cells showed definite changes in morphology from short branched, curved and straight rods at 8–12 hours to staphyococcus-like forms at 24–48 hours. Many of these cells exhibited uneven staining reaction. The cultures failed to initiate growth in synthetic medium with phenol as a carbon source and produced nitrites from nitrates, thus eliminating Mycoplana as a generic possibility. Growth did not occur on nitrogen-free synethtic media, thus eliminating the genus Azotobacter. Growth occurred on mannitol-calcium-glycerophosphate agar of Riker et al. without browning of media; also these cultures produced large circular colonies on nutrient gelatin. These characteristics eliminate Agrobacterium radiobacter as a generic possibility.

The occasional formation of "Y," "T," and "U" forms with uneven staining appeared typical of one of the soil diphtheroids. The growth on inorganic nitrogen and the gram-negative staining reaction eliminated Corynebacterium and pointed toward Arthrobacter as the probable genus.

The isolated cultures were compared physiologically and morphologically with known species of Arthrobacter. All control cultures were grown in media in which a maximum extent of polymer production was shown by B–1973 and B–1797. This medium consisted of 0.25 percent enzyme hydrolyzed casein, 3 percent commercial corn sugar, $MgSO_4 \cdot 7H_2O$, $MnSO_4 \cdot 4H_2O$ and dibasic potassium phosphate buffer, pH 7.0. None of the control organisms produced any polysaccharide under these conditions. The differences and similiarities between controls and unknown cultures are summarized in Table I.

The differences noted are sufficient to designate a new species. The name Arthrobacter viscosus, sp. n. is proposed with respect to the formation of slimes in simple basal medium supplemented with each of 10 different carbon sources. Strain NRRL B–1797 is designated as the type species since it was the first one studied. NRRL B–1973, since it closely resembles B–1797 in physiology and morphology, is considered a strain of the same species. The description of type species NRRL B–1797 follows.

Colonial characteristics

Agar streak: filiform, moderate growth, glistening, cream-like mucoid. Agar colonies: large (3 mm.), circular, smooth, entire, flat, opaque, glistening, very mucoid. Gelatin colonies: circular, raised, entire, opaque, cream, smooth, glistening, very mucoid. Soil extract agar slant: growth abundant, white, filiform, very glistening, mucoid. Asparagine agar slant: growth moderately abundant, white, filiform, glistening, very mucoid. Asparagine colonies: 1–1.5 mm. circular, translucent, white. Potato: growth moderate, viscous, glistening, filiform, light brown. Mannitol-Ca-glycerophosphate agar slant: very mucoid, white, raised, filiform, glistening. Mannitol-Ca-glycerophosphate agar colonies: 4.5 mm., spreading, raised, glistening, very mucoid, white precipitate formed around colonies, no brown precipitate. Yeast-malt slant: (Haynes et al., (1955)): heavy, mucoid, white growth which is moderate in 24 hours and profuse in 48 hours.

Physiology

Aerobic, very slightly catalase positive. No acid produced from glucose, sucrose, lactose or mannitol; final pH was 7.7. Slight acid production was noted in glycerol (pH 6.2). No acid production from arabinose (pH 7.9), or from raffinose and 2-methyl-glucoside (pH 8.3). No gas produced from any of the tested carbohydrates. No gelatin liquefaction noted after 3 months incubation. Indole not produced. Acetylmethylcarbinol not produced. Nitrite produced from nitrates. No starch hydrolysis occurred. Litmus milk half cleared in one month; serum clear; partial reduction after one month; hard pellicle on milk after one month; no curd formed and pH of reaction slightly alkaline. Urease not produced. Citrate utilized as the sole source of carbon. Hydrogen sulfide not produced from cysteine or thiosulfate. Growth occurred on inorganic nitrogen sources supplemented with various carbon sources. No cellulose activity. Optimum temperature, 25 C. to 28 C. Growth greatly reduced at 37 C. as well as at 10 C. The optimum pH (FIG. I) was 6.1 and growth was sharply reduced at pH values below 5.0 and above 7.0.

Figure 2:
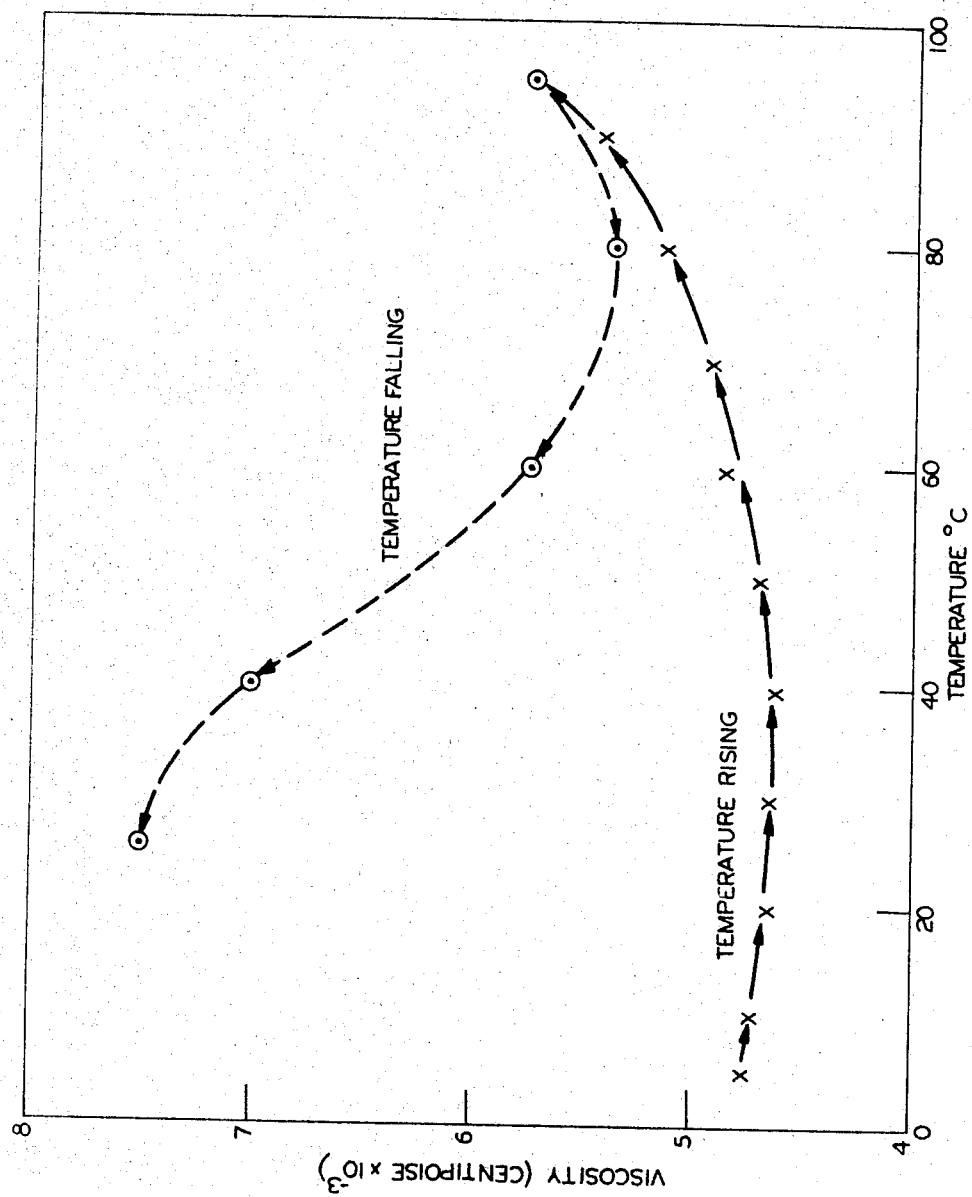
Figure 3:
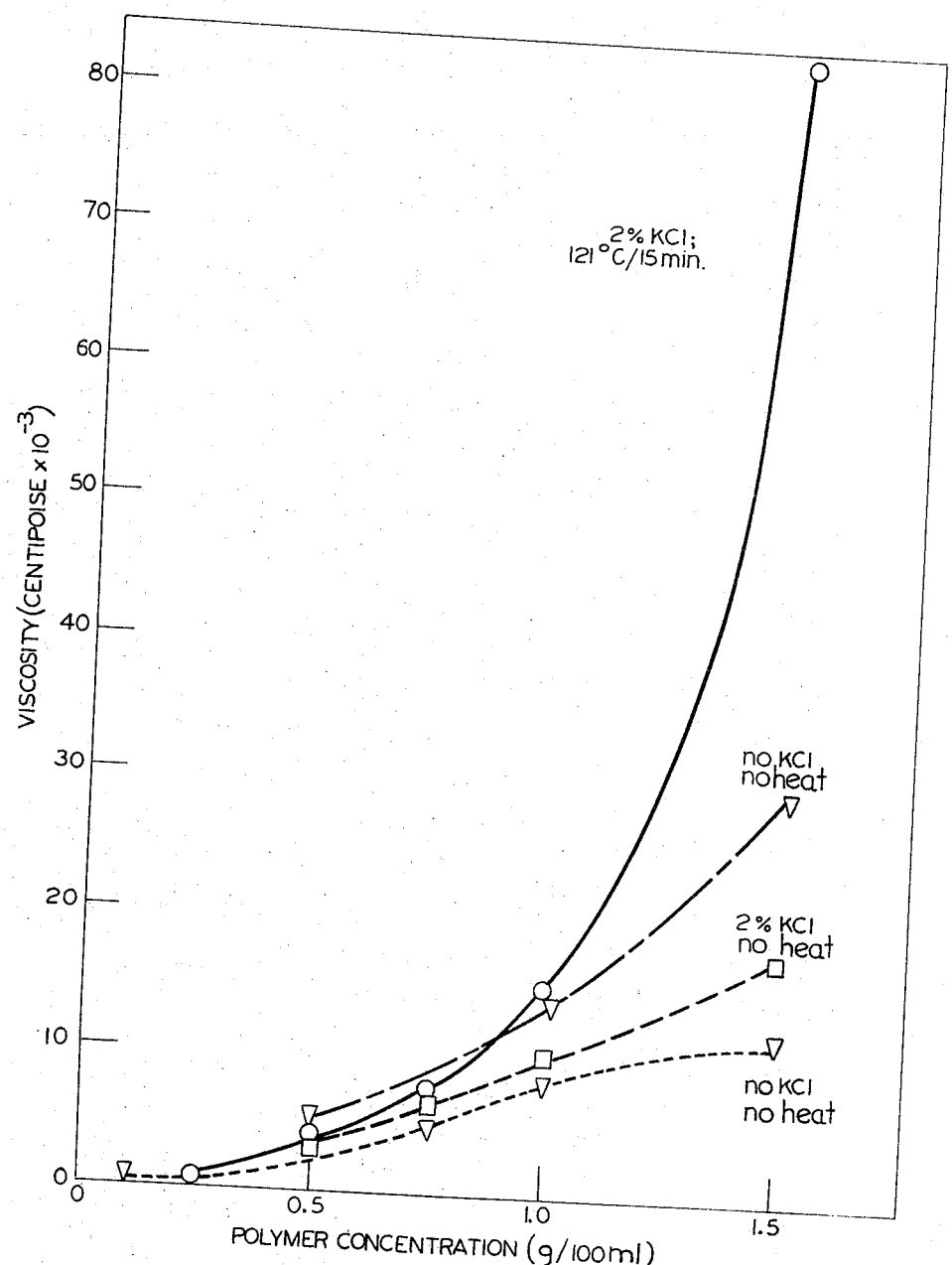

Strain NRRL B-1797. The optimum temperature for production of the gum was 25 C. Optimum pH for gum production was 7.0 with none produced at pH values below 4.0 with reduced production at 5.0, 6.0, 8.0, and 9.0 and none at pH 10.0 (FIG. 2).

Morphology

Cells used for study were grown in nutrient broth on a rotary shaker at 24 C.

At 12 hours, gram-negative long and short rods were common. Many "T," "Y," "X," and "U" shaped cells were present as well as curved rods. Most of these cells were unevenly stained. Some of the longer rods had 2-4 heavily stained granules in a lighter stained cell. The shorter rods almost approached coccoid forms and had heavier stained ends and lighter stained center portions. At 24-48 hours staphlococcus-like groupings of cells were predominant. A few large single coccoids were present.

Flagella stains were made on cells grown on YM slants and suspended in distilled $H_2O$. Observations were made at 12 hours. Flagella were not observed, but highly plomorphic "Y," "T," and "U" forms were again observed with this staining procedure.

Strain NRRL B-1973 produced viscous growth in liquid media, but its growth on yeast-malt slants and other solid media was not extremely mucoid. Since this organism differs in this respect and in one physiological aspect, the production of urease, it will be considered a variant of B-1797. Following is the description of this culture.

Colonial characteristics

*Agar streak:* fiiliform, raised, glistening, viscous. *Agar colonies:* 3 mm., circular, raised, glistening, viscous, white opaque. *Soil extract agar:* filiform, moderate growth, glistening, soft, viscous, raised, cream-colored. *Gelatin colonies:* circular, 2-3 mm., smooth, raised, glistening, opaque, no liquefaction. *Asparagine agar slant:* growth moderately abundant, light cream, slightly mucoid, glistening, wrinkled edge. *Asparagine agar colonies:* 1 mm., circular, translucent, white, raised, slightly mucoid. *Potato:* growth moderately abundant, glistening, soft, filiform, cream-buff. *Yeast-malt slant:* viscous, profuse white growth, slightly mucoid in 24 hours. *Mannitol-Ca-glycerol-phosphate colonies:* 3-3.5 mm., raised, glistening, mucoid, circular, white precipitate formed around colonies, no browning of medium.

Physiology

Aerobic, weakly catalase positive. No acid production in glucose, sucrose, lactose, or mannitol. Final pH of fermentation of glucose was 7.7, sucrose and lactose, 7.5, and mannitol, 7.3. Slight acid production was noted in glycerol (pH 6.2). Basic products resulted from fermentations of arabinose, raffinose and α-methyl glucoside, (pH 8.3-8.4). No gelatin liquefaction shown after 3 months incubation. Indole not produced. Acetylmethylcarbinol not produced. Nitrites were produced from nitrates. No starch hydrolysis. Litmus milk completely cleared in one month with no curd formation; reduction began in 25 days and was complete in 2 days; a hard pellicle was formed on milk in about 21 days and the reaction was slightly basic. Urease produced. Citrate utilized as the sole source of carbon. $H_2S$ not produced from either cysteine or thiosulfate. Growth occurred on inorganic nitrogen, but only slight polymer production noted on inorganic nitrogen plus glucose; moderate polymer production shown on inorganic nitrogen plus crude maltose. Optimum temperature, 25-28 C. No growth occurred at 37 C. and little growth was shown after 3-4 days incubation at 10 C. The optimum pH (FIG. 1) was 6.1 and growth was greatly reduced at pH values below 5.0 and above 7.0.

Morphology

At 12-19 hours, short gram-negative rods were present. Some were evenly stained, but the majority were unevenly stained. Some "Y," "X," "U," and "T" forms were present and these also were unevenly stained. The short rods had heavily stained ends and were lightly stained in the central portion. The longer rods appeared to have 3-6 heavy staining granules in a lighter stained cell.

After 24-48 hours micrococcus-like cell groupings were present and predominant. These cells were unevenly stained but appeared to be gram-negative.

Flagella staining of cells grown on YM slant and suspended in distilled $H_2O$, showed the presence of no flagella, but the highly pleomorphic "Y," "X," and "U" forms were plainly visible with this staining technique.

TABLE I.—COMPARISONS BETWEEN KNOWN STRAINS OF ARTHROBACTER AND NEW STRAINS

|  | A. globiformis NRRL B-2880 | A. pascens | | A. simplex Jensen (1954) | A. oxydans Sguros (1955) | A. aurescens NRRL B-2879 | A. tumescens NRRL B-2881 |
|---|---|---|---|---|---|---|---|
|  |  | NRRL 1814 | NRRL B-2884 |  |  |  |  |
| Gelatin Liquefaction. | + stratiform | + | + | + | + slow | + | +. |
| Starch hydrolysis | + | + | + | − | + | + | + weak. |
| $H_2S$ Production | Slight in cysteine. | + in cysteine | − | Cysteine + thio +. | − | Cysteine thio +. | −. |
| Chromogenesis | Cream | White | White | Cream | Yellow and gray. | Pale yellow | Gray, cream. |
| Catalase | + | + | − | + | + | + | −. |
| Motility | None | None | − | +− | None | None | None. |
| Citrate utilization | + | + | + | + | + | + | −. |
| $NO_2 + NO_3$ utilized as sole N source. | + | + | + | + | + | + | −. |
| $B_{12}$, thiamin, or terrogens factor (Lochhead 1953) needed for growth. | No | No | No | No | No | No | No. |

TABLE I.—COMPARISONS BETWEEN KNOWN STRAINS OF ARTHROBACTER AND NEW STRAINS.—Continued

| | A. citreus NRRL B-1258, B-2882 | A. terregens Lochhead and Burton (1953) | A. atrocyaneus NRRL B-2883 | A. duodecadis Lochhead (1953) | A. flavescens Lochhead (1958) | A. viscosus | |
|---|---|---|---|---|---|---|---|
| | | | | | | NRRL B-1973 | NRRL B-1797 |
| Gelatin Liquefaction | + | − | + slow | + | + | − | −. |
| Starch hydrolysis | − | − | − | − | + | − | −. |
| H₂S Production | | | | | | − | −. |
| Chromogenesis | Yellow | Yellow brown | (on Y. pa.) black. | Cream-pale brown. | Yellow | White | White. |
| Catalase | + | + | + | | | Slight + Feebly | Slight +. Feebly. |
| Motility | Slight | − | | − | − | + | +. |
| Citrate utilization | − | − | − | − | − | + | +. |
| NO₂ + NO₃ utilized as sole N source | − | − | − | | | No | No. |
| B₁₂, thiamin, or terregens factor (Lochhead 1953) needed for growth. | No | Terregens factor | No | | Terregens factor + thiamine biotin. | | |

TABLE II.—COMPARISONS BETWEEN KNOWN STRAINS OF ARTHROBACTER AND NEW STRAINS

| | A. globiformis NRRL B-2880 | A. pascens | | A. simplex Jensen (1954) | A. oxydans Sguros (1955) | A. aurescens NRRL B-2879 | A. tumescens NRRL B-2881 |
|---|---|---|---|---|---|---|---|
| | | NRRL 1814 | NRRL B-2884 | | | | |
| NO₂ from NO₃ | + | + | + | + | + | + | + |
| N₂ from NO₂ | − | − | − | − | − | − | − |
| Growth viscous in liquid media | No | Yes | Very | NO | Yes | No | No |
| Growth at 57 C | − | − | + | + | − | Slight | Poor |
| Litmus milk | Clearing slow alkaline. | Clearing slow | Reduction clearing. | Slow | Clearing reduction alkaline. | Clearing | Soft curd clearing. |

| | A. citreus NRRL B-1258, B-2882 | A. terregens Lochhead and Burton (1953) | A. atrocyaneus NRRL B-2883 | A. duodecadis Lochhead (1958) | A. flavescens Lochhead (1958) | A. viscosus | |
|---|---|---|---|---|---|---|---|
| | | | | | | NRRL B-1973 | NRRL B-1797 |
| NO₂ from NO₃ | + | + | + | + | + | + | +. |
| N₂ from NO₂ | − | − | − | − | − | − | −. |
| Growth viscous in liquid media | No | No | No | No | + | Very | Very. |
| Growth at 37 C | − | − | + | − | − | − | − Slight. |
| Litmus milk | No change | No change | Soft curd, clearing basic. | No change | No change | Reduction clearing, slightly alkaline. | Reduction clearing, slightly alkaline. |

Having fully disclosed our invention, we claim:

A method of increasing by about twenty-fold the viscosity of a 1 percent aqueous solution of a polysaccharide consisting of glucose, galactose, mannuronic acid and O-acetyl moieties that are respectively present in the molar proportions of 1:1:1:5 and which polysaccharide is prepared by the process comprising inoculating a sterilized fermentation medium present in a paddle equipped fermentor and having the following composition per 100 ml.

| Commercial corn sugar | g | 3.0 |
|---|---|---|
| Enzyme-hydrolyzed casein | g | 0.25 |
| MgSO₄·7H₂O | g | 0.08 |
| MnSO₄·4H₂O | g | 0.005 |
| KH₂PO₄ | g | 0.4 |
| Water q.s.a.d. | ml | 100 | with a culture of a species of diphtheroidic bacterium selected from the group consisting of *Arthrobacter viscosus* NRRL B-1973 and *Arthrobacter viscosus* NRRL B-1797, internally agitating the inoculated medium at 25° C. in the presence of air for about 96 hours while periodically increasing the rate of agitation by operating the paddles at 200 r.p.m. for the first 24 hours, then at 300 r.p.m. for the second 24 hours, and then at 500 r.p.m. for the remainder of the fermentation, diluting the viscous medium with dilute aqueous methanol, removing unwanted cells and debris, adding ethanol and a salt selected from the group consisting of potassium chloride and potassium acetate to precipitate the polysaccharide, and isolating the precipitated polysaccharide, said method comprising adding to said 1 percent aqueous solution of said polysaccharide at least 0.05 percent but not exceeding 0.25 percent by weight of aluminum sulfate.

No references cited.

A. LOUIS MONACELL, *Primary Examiner.*

J. M. HUNTER, *Assistant Examiner.*